106-90  AU 115     EX
5/16/78  OR  4,089,696

United States Patent [19]
Ray

[11] 4,089,696
[45] May 16, 1978

[54] HYDRAULIC CEMENT MIXES AND PROCESS FOR IMPROVING HYDRAULIC CEMENT MIXES

[75] Inventor: James A. Ray, Mantua, Ohio

[73] Assignee: Martin Marietta Corporation, Bethesda, Md.

[21] Appl. No.: 731,021

[22] Filed: Oct. 8, 1976

[51] Int. Cl.$^2$ .............................................. C04B 7/35
[52] U.S. Cl. ........................................ 106/90; 106/97; 106/104; 106/314; 106/315
[58] Field of Search ............... 106/90, 315, 314, 97, 106/98, 104

[56] References Cited
U.S. PATENT DOCUMENTS 1,998,667  4/1935  Fritz et al. ............................. 106/90
2,203,809  6/1940  Bechtold ................................ 106/90

*Primary Examiner*—J. Poer
*Attorney, Agent, or Firm*—Gay Chin; George W. Moxon, II

[57] ABSTRACT

A hydraulic cement mix including hydraulic cement, aggregate, sufficient water to effect hydraulic setting of the cement, and an additive comprising at least one acetic acid ester of glycerin, wherein the additive is present in an amount sufficient to increase the strength of the mix when hardened. The additive is preferably selected from the group comprising monoacetin, diacetin, triacetin, and mixtures thereof and is present generally in an amount of up to 2.0% by weight based upon the weight of the cement, usually between 0.01% and 2.0% by weight.

8 Claims, No Drawings

HYDRAULIC CEMENT MIXES AND PROCESS FOR IMPROVING HYDRAULIC CEMENT MIXES

BACKGROUND OF THE INVENTION

This invention relates to additive compositions, otherwise known as admixtures, for incorporation in hydraulic cement mixes, for example, hydraulic cement concretes, mortars, and grouts, neat cement mixes, nonplastic cement or concrete mixes, such as concrete block mixes, and dry mixes for making such concretes, mortars, and grouts.

Many admixtures employed to achieve improved compressive strength are known to act also as set retarders, as well as to reduce the quantity of water utilized in the hydraulic cement mix. In general, a reduction in the amount of water employed results in an increase in compressive strength. As retarders, such admixtures slow the chemical process of hydration so that the conrete remains plastic and workable for a longer time than concrete without such a retarder. Among the materials commonly used for improved compressive strength are the lignosulfonates, such as calcium lignosulfonate; salts of hydroxycarboxylic acids; sugars such as glucose (dextrose), maltose and the like; and highlypolymerized polysaccharides, such as dextrins.

While admixtures having set retarding and compressive strength improving properties are useful as set retarders per se, frequently there are instances where improved compressive strength is desired but any significant retarding of the rate of hardening of the cement or concrete mix would be undesirable. An example might be where concrete is to be placed during cold, especially freezing winter weather conditions. In such an instance, it is more desirable to have an accelerated setting, hardening, and strength development for the cement or concrete mix, as this will permit earlier removal of form work, speed up repair work, and reduce the time required for moist curing. To overcome the undesirable retarding effect, well known acceleration techniques that increase the rate of hydration for early strength development are frequently used to overcome the retarding tendency of the water reducer. Among the various techniques employed for this purpose are the increasing of the proportion of Portland cement in the mix; the use of the most rapid setting type of cement available; the heating of the water and other components of the concrete; and the use of chemical admixtures that act, catalytically or otherwise, to increase the rate at which the concrete hardens. Calcium chloride and alkanolamines, such as triethanolamine, are commonly employed as accelerating admixtures.

In those instances where the accelerator is added along with a strength increasing, but retarding admixture, the accelerator must be used in sufficient quantity that it neutralizes the retarding effect, or where needed, imparts an accelerating effect to the mix. This can lead to unpredictable results since the accelerator must be used in rather large quantities. Further, the use of chlorides can lead to a corrosion problem, which is an additional undesirable side effect, especially with pre-stressed concrete.

Other agents such as urea and calcium formate and the aforementioned alkanolamines, are not known to promote corrosion of metal, but have a less pronounced effect in accelerating the rate of hardening of concrete. Further, the use of low molecular weight aldehydes and polymers thereof, e.g., paraformaldehyde or Paraform, are known to strongly accelerate the rate of hardening of concrete containing Portland cement, but in aqueous solution such materials evolve esthetically objectionable and toxic fumes. As a result, the quantity of these materials that can be incorporated into concrete for set acceleration purposes without imparting such undesirable fumes to the concrete is very limited.

Thus a need exists for additive compositions, or admixtures, for incorporation in hydraulic cement mixes, which additives will provide improved compressive strength and/or accelerated rate of hardening and setting for the resulting cement products, while not causing adverse effects on the hydraulic mixes, such an unduly entraining air, or producing undesirable fumes or corrosive effects.

SUMMARY OF THE INVENTION

The present invention is to an additive composition or admixture for incorporation in hydraulic cement mixes, such as concretes, mortars, and grouts, neat cement mixes, nonplastic cement mixes, and dry mixes for making concretes, mortars, and grouts and thus the improved cement mixes and process for incorporating the additive composition.

For the purposes of this invention, the term "hydraulic cement" is intended to means and to include all cementious compositions capable of being set and hardened by the action of water, such as Portland cements, sulphate-resisting cements, blast-furnace cements, pozzolanic cements, and high-alumina cements, since the additive composition or admixture of the present invention can be incorporated into all hydraulic cement mixes. But the preferred use of the present composition or admixture is in Portland type cement mixes. Also for the purposes of this invention, the term "Portland type cement" is intended to include all cementious compositions which have a high content of tricalcium silicate and thus are Portland cement or are chemically similar or analogous to Portland cement, the specification for which is set forth in ASTM C 150-74. This would include cements, in which flyash, such as from steam or power generating stations, pozzolana slag, such as from blast furnaces, or mixtures of these, are incorporated and which result in a Portland type cement.

Broadly, the invention comprises a hydraulic cement mix including hydraulic cement, aggregate, sufficient water to effect hydraulic setting of the cement, and an additive comprising at least one acetic acid ester of glycerin, the additive being present in an amount sufficient to increase the compressive strength of the hardened mix. The additive is preferably selected from the group comprising monacetin, diacetin, triacetin, or mixtures thereof, and is present in an amount of up to about 2.0% by weight based upon the weight of the cement, generally in an amount of between about 0.01% and about 2.0% by weight based upon the weight of the cement, preferably in an amount in the range of about 0.025% to about 2.0% by weight, although when the additive is monacetin, an amount in the range of between about 0.025% and about 1.0% by weight based upon the weight of the cement is further preferred, with the range of about 0.05% to about 1.0% by weight being additionally preferred, when the additive is diacetin, amount in the range of about 0.025% to about 1.0% by weight based upon the weight of the cement is further preferred, with an amount of between about 0.1% and about 1.0% by weight being additionally preferred, and when the additive is triacetin, an amount in the range of about 0.01% to about 1.0% by weight based upon the weight of the cement is further preferred.

Use of the additive is beneficial to the engineering properties of hydraulic cement mixes in that it results in products of improved compressive strength over similar mixes prepared without the additive. Further, use of this additive in Portland type cements within the preferred ranges generally results in an acceleration of the rate of hardening and setting of the hydraulic mixes, without causing the normal corrosion problems present with chloride accelerators, such as calcium chloride, or unduly increasing the amount of air entrained in the resulting concrete product.

It is therefore an object of the present invention to provide improved hydraulic cement mixes.

It is another object of this invention to provide improved hydraulic cement mixes, such as Portland type cement mixes, including concrete, mortar and grout mixes, neat cement mixes, nonplastic cement mixes, and dry mixes, which include an additive composition or admixture which will advantageously increase the compressive strength and/or rate of hardening and setting of the cement mix.

It is a further object to provide a process for increasing the strength of cement mixes without adversely affecting the setting times.

It is yet another object of this invention to provide a process for increasing the compressive strengths and/or the rate of hardening and setting of cement mixes.

DETAILED DESCRIPTION OF THE INVENTION

The acetic acid esters of glycerin are represented by the following general formula:

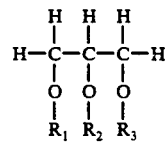

wherein $R_1$, $R_2$ and $R_3$ represent hydrogen or an acetyl group ($CH_3CO$). When one hydrogen is replaced with an acetyl group, it is known as glyceryl monoacetate or monoacetin. Where there are two acetyl groups, it is known as glyceryl diacetate or diacetin, and with three acetyl groups, triacetin or glyceryl triacetate.

The acetins are esters prepared by reacting acetic acid and glycerin and are clear or colorless, thick liquids which are soluble in or miscible with water and alcohol. The acetins are commercially available products and have known utility as medicines (external), plasticizers and solvents.

In the practice of the present invention, the acetins are incorporated in hydraulic cement mixes, such as Portland or Portland type cement concretes and mortars, high-alumina cement concretes and mortars and the like, and dry mixes for making such concretes and mortars, in amounts sufficient to increase the compressive strength of the hardened mix upon setting thereof. Broadly, the acetins will be incorporated in the cement mix in an amount within the range of from about 0.01% to about 2.0% by weight, preferably with the range of 0.025% to 2.0% by weight. When the additive is monoacetin, the additive is present further preferably in an amount in the range of 0.025% to 1.0% by weight, with the range of 0.05% to 1.0% by weight being preferred also. When the additive is diacetin, it is present further preferably in an amount in the range of 0.025% to 1.0% by weight, with the range 0.1% to 1.0% by weight being preferred also. When the additive is triacetin, the further preferred addition range is between 0.01% and 1.0% by weight.

The additive of the present invention is incorporated into hydraulic cement mixes preferably by adding it to a portion of the mix water used for mixing of the hydraulic cement and aggregate. But, the additive could be incorporated in any other convenient manner, including adding it to the dry mix before the water is incorporated therein.

The term aggregate is intended to include both fine aggregate, such as sand, and coarse aggregate, such as crushed stone or gravel, as is common in the art. In general for mortars, the aggregate may be sand or other fine aggregate meeting the requirements of ASTM standard C-33. In general for concretes, the aggregate may be sand or other fine aggregate plus crushed stone or gravel or other coarse aggregate in accordance with ASTM standard C-33. The precise size, purity, quality, and quantity, or ranges thereof, of the fine and coarse aggregates will vary depending upon the desired use and properties of the mortar or concrete. For most common uses, although not limited thereto, the size of the fine aggregate will be with the broad range of about +4 mesh to −100 mesh, while the size of the coarse aggregate will be within the broad range of 3 inches to 4 mesh. The coarse aggregate will usually be of mineral origin, such as gravel or crushed rock, but it may in some cases consist at least partially of graded metallic material such as iron chips, slag, or other manufactured aggregate.

Further in general for dry mortar mixes, the proportion of fine aggregate to cement will be in the range of about 25% to about 75% by weight based upon the weight of the cement mix, depending upon the nature of the aggregate and the desired properties and use of the mix.

For both the mortars and cements, the amount of water employed generally should be enough to effect hydraulic setting of the cement present in the mix and to provide suitable workability. This may broadly range from about 20% by 60% by weight of the cement in the mix for the mortars and about 25% to 70% by weight of the cement in the mix for the concretes. The precise amounts of water will depend upon the end use of the cement mix, as well as the aggregate present in the mix.

For purposes of illustrating the advantageous results obtainable by the practice of the present invention, plain cement mixes were prepared and compared with such mixes in which monoacetin, diacetin, and triacetin have been incorporated in varying dosages. The same type and brand of cement was used in each mix, and the proportion and kind of aggregate employed were substantially the same. A sufficient amount of water was added to each mix to effect hydraulic setting of the cement mix and to produce cement mixes of essentially the same consistency. The tests from which the results were derived were those commonly employed and standardized in the ASTM standards for testing cement mixes. In addition and for the purpose of further illustrating the invention, comparisons were made with triethanolamine and calcium chloride ($CaCl_2$) since chlorides and triethanolamine are known and commercially available as accelerating admixtures.

The results shown in Table No. I illustrate the use of acetins, namely monoacetin, diacetin, and triacetin in amounts of up to 1.0% by weight based upon the weight of the cement in two Type I Portland cement mixes (where the cements were from different manufacturers) to form concretes. The fine aggregate to coarse aggregate ratio employed was 0.48 for runs 1-20 and 0.49 for runs 21-36, the amount of cement per cubic yard was 5 sacks (a sack of cement weighs 94 lbs.) and the consistencies of the concretes were such that they had slumps in the range of 3 to 3¾ inches. As can be seen, the use of acetins resulted in approximately the same or increased compressive strengths over similar mixes without the additive, without adversely affecting the setting times of the cement mixes or increasing the amount of air entrained therein. In fact, the addition of the acetins resulted in a generally beneficial acceleration of the setting times for the cement mixes involved. In comparison to the use of a triethanolamine admixture, which is a well known, commercially available accelerator, the acetins produced comparable compressive strength gains, while achieving a lesser degree of acceleration.

With monoacetin and triacetin, their use clearly produced a beneficial acceleration, as compared to plain mixes. With diacetin, its use produced a slight retardation of the rate of hardening in one of the brands of Type I Portland cement and an acceleration of the rate of hardening in another brand of Type I Portland cement as compared to plain cement mixes from the respective brands. Slight variances in the results can occur with different commercial brands of Portland cement, and so such results are properly considered in an overall context. That is, if an average of these results is considered, the use of diacetin results in a general or overall acceleration of the rate of hardening of the cement mixes. Therefore, in addition to the use of the acetins to produce an increase in the compressive strengths of cement mixes, the additive compositions or admixtures of the present invention, i.e., the acetins, would be useful as accelerators per se, especially since they would not lead to the types of corrosion problems associated with chloride type accelerators.

The results shown in Table II further illustrate the use of the acetins in Type I Portland cement mixes, the cement components of which are the Table I

| Mix No. | Additive | Dose; Percent by weight of cement | Water; lbs./ cu. yd. of cement product | Air; vol. percent of cement product | Rate of hardening relative to plain mix;[1] hours | Compressive strength of cement product; p.s.i. 7 days | 28 days |
|---|---|---|---|---|---|---|---|
| Cement No. 1 | | | | | | | |
| 1 | None | 0 | 321 | 1.7 | 0 | 2860 | 4540 |
| 2 | Triethanolamine | .025 | 316 | 2.1 | −⅛ | 3100 | 4835 |
| 3 | Monoacetin | .01 | 317 | 1.8 | 0 | 2740 | 4555 |
| 4 | Monoacetin | .025 | 318 | 1.9 | 0 | 2720 | 4395 |
| 5 | Monoacetin | .05 | 316 | 2.0 | 0 | 2900 | 4670 |
| 6 | Monoacetin | .1 | 316 | 2.0 | 0 | 2920 | 4780 |
| 7 | Monoacetin | .25 | 314 | 2.4 | 0 | 2950 | 4720 |
| 8 | Monoacetin | .5 | 309 | 2.6 | −⅛ | 3260 | 5080 |
| 9 | Monoacetin | 1.0 | 309 | 2.8 | −⅞ | 3290 | 4895 |
| 10 | Triethanolamine +Monoacetin | 0.025 Total (.0125 + .0125) | 316 | 2.0 | −¼ | 3160 | 4725 |
| Cement No. 2 | | | | | | | |
| 11 | None | 0 | 315 | 2.0 | 0 | 2935 | 4305 |
| 12 | Triethanolamine | .025 | 308 | 2.3 | −⅝ | 3115 | 4425 |
| 13 | Monoacetin | .01 | 310 | 1.9 | −⅛ | 2905 | 4295 |
| 14 | Monoacetin | .025 | 310 | 2.0 | −⅛ | 3060 | 4475 |
| 15 | Monoacetin | .05 | 310 | 1.9 | −¼ | 3025 | 4450 |
| 16 | Monoacetin | .1 | 308 | 2.1 | −¼ | 3050 | 4480 |
| 17 | Monoacetin | .25 | 307 | 2.4 | −¼ | 3190 | 4715 |
| 18 | Monoacetin | .5 | 305 | 2.4 | −⅝ | 3310 | 5090 |
| 19 | Monoacetin | 1.0 | 304 | 2.8 | −¾ | 3450 | 4885 |
| 20 | Triethanolamine +Monoacetin | 0.025 Total (.0125 + .0125) | 306 | 2.5 | −¼ | 3150 | 4585 |
| Cement No. 1 | | | | | | | |
| 21 | None | 0 | 301 | 1.7 | 0 | 3335 | 4995 |
| 22 | Diacetin | .01 | 293 | 2.0 | 0 | 3475 | 5250 |
| 23 | Diacetin | .025 | 292 | 1.9 | +⅛ | 3485 | 5345 |
| 24 | Diacetin | .05 | 291 | 2.0 | +⅜ | 3575 | 5505 |
| 25 | Diacetin | .1 | 292 | 2.0 | +¼ | 3620 | 5445 |
| 26 | Diacetin | .25 | 290 | 2.1 | +¼ | 3840 | 5685 |
| 27 | Diacetin | .5 | 286 | 2.5 | 0 | 3945 | 5955 |
| 28 | Diacetin | 1.0 | 285 | 2.6 | −⅛ | 4175 | 5655 |
| Cement No. 2 | | | | | | | |
| 29 | None | 0 | 302 | 1.6 | 0 | 3320 | 5020 |
| 30 | Diacetin | .01 | 297 | 1.7 | −¼ | 3515 | 5080 |
| 31 | Diacetin | .025 | 295 | 1.7 | −¼ | 3520 | 5060 |
| 32 | Diacetin | .05 | 296 | 1.6 | −¼ | 3540 | 5190 |
| 33 | Diacetin | .1 | 298 | 1.7 | −¼ | 3545 | 5270 |
| 34 | Diacetin | .25 | 297 | 1.8 | −½ | 3715 | 5465 |
| 35 | Diacetin | .5 | 292 | 2.1 | −½ | 3760 | 5740 |
| 36 | Diacetin | 1.0 | 291 | 2.5 | −1 | 4255 | 5880 |
| Cement No. 1 | | | | | | | |
| 37 | None | 0 | 301 | 1.7 | 0 | 3355 | 4980 |
| 38 | Triacetin | .01 | 297 | 1.8 | −⅛ | 3605 | 5315 |
| 39 | Triacetin | .025 | 297 | 1.8 | −⅛ | 3520 | 5185 |
| 40 | Triacetin | .05 | 297 | 1.8 | −⅛ | 3620 | 5355 |
| 41 | Triacetin | .1 | 297 | 1.9 | −⅛ | 3560 | 5265 |
| 42 | Triacetin | .25 | 297 | 1.9 | −¼ | 3755 | 5470 |
| 43 | Triacetin | .5 | 293 | 2.3 | −¼ | 3905 | 5685 |
| 44 | Triacetin | 1.0 | 291 | 2.6 | −½ | 3910 | 5740 |
| Cement No. 2 | | | | | | | |
| 45 | None | 0 | 299 | 1.7 | 0 | 3740 | 4975 |

Table I-continued

| Mix No. | Additive | Dose; Percent by weight of cement | Water; lbs./ cu. yd. of cement product | Air; vol. percent of cement product | Rate of hardening relative to plain mix;[1] hours | Compressive strength of cement product; p.s.i. | |
|---|---|---|---|---|---|---|---|
| | | | | | | 7 days | 28 days |
| 46 | Triacetin | .01 | 295 | 1.8 | 0 | 3815 | 4980 |
| 47 | Triacetin | .025 | 295 | 1.7 | −⅛ | 3850 | 5080 |
| 48 | Triacetin | .05 | 295 | 1.7 | −⅛ | 3820 | 5065 |
| 49 | Triacetin | .1 | 295 | 1.8 | −⅛ | 3850 | 5205 |
| 50 | Triacetin | .25 | 293 | 2.0 | 0 | 4215 | 5615 |
| 51 | Triacetin | .5 | 291 | 2.2 | −⅛ | 4360 | 5915 |
| 52 | Triacetin | 1.0 | 288 | 2.6 | −⅜ | 4490 | 5820 |

[1]Acceleration of set is indicated by a minus (−) sign, while retardation of set is indicated by a plus (+) sign.

same as those in the tests in Table I, to form concretes. The fine aggregate to coarse aggregate ratio employed was 0.48, 5 sacks of cement per cubic yard of concrete were used, and the concretes had slumps in the range of 3¼ to 3¾ inches.

In addition, the dosage range was extended to 2.0% by weight, based upon the weight of the cement, and comparisons were made with commercially available calcium chloride, as well as a commercially available mixed isopropanolamine admixture, which is comprised predominantly of triisopropanolamine and is also known as an accelerating agent.

As can be seen from Table II, the acetins, while being less accelerating than the chlorides, produce comparable to superior compressive strength gains. Further, although the 2.0% by weight dosage proved to be slightly retarding in one of the brands of cement, it still would be considered an accelerator and the use of the admixture in accordance with this invention in that amount did result in an increase in the compressive strength of the resulting cement product.

The results shown in Table III illustrate that mixtures or blends of the acetins can be employed with the same beneficial results as are obtained when the acetins are used singly. In these examples monoacetin, diacetin and triacetin, singly, and a mixture of diacetin plus triacetin were employed in Type I Portland cements similar to those in the examples for Table I, at a dosage of 1.0% by weight based upon the weight of the cement, to make concrete mixes. The fine aggregate to coarse aggregate ratio employed was 0.48. The amount of cement was 5 sacks per cubic yard (470 lbs.), and the consistencies of the concretes were such that they had slumps in the range of 3¼ to 3¾ inches. The compressive strengths were measured at one and twenty-eight days, as compared to the usual 7 and 28 days, in order to evaluate the use of acetins as early strength development admixtures.

Table II

| Mix No. | Additive | Dose; Percent by weight of cement | Water; lbs./ cu. yd. of cement product | Air; vol. percent of cement product | Rate of hardening relative to plain mix; hours | Compressive strength of cement product; p.s.i. | |
|---|---|---|---|---|---|---|---|
| | | | | | | 7 days | 28 days |
| Cement No. 1 | | | | | | | |
| 53 | None | | 309 | 1.7 | 0 | 3005 | 4540 |
| 54 | CaCl₂ | 1.0 | 309 | 2.0 | −2 3/8 | 3430 | 4470 |
| 55 | CaCl₂ | 2.0 | 309 | 2.0 | −3 3/8 | 3230 | 4280 |
| 56 | Triacetin | 1.0 | 309 | 2.3 | −1 1/2 | 3595 | 5115 |
| 57 | Triacetin | 2.0 | 300 | 2.6 | −3/8 | 3430 | 4785 |
| 58 | Monoacetin | 1.0 | 306 | 2.3 | −7/8 | 3650 | 4975 |
| 59 | Monoacetin | 2.0 | 301 | 2.4 | −3/8 | 3465 | 4655 |
| 60 | Diacetin | 1.0 | 303 | 2.4 | −7/8 | 3710 | 5200 |
| 61 | Diacetin | 2.0 | 300 | 2.5 | −3/8 | 3455 | 4755 |
| 62 | Mixed Isopropanolamines plus Diacetin | 0.075 Total (0.025 + 0.05) | 307 | 2.7 | −1/8 | 3210 | 5030 |
| Cement No. 2 | | | | | | | |
| 63 | None | | 314 | 1.9 | 0 | 3285 | 4750 |
| 64 | CaCl₂ | 1.0 | 311 | 1.9 | −1 1/4 | 3880 | 4965 |
| 65 | CaCl₂ | 2.0 | 313 | 1.9 | −2 5/8 | 3845 | 4930 |
| 66 | Triacetin | 1.0 | 309 | 2.4 | −1/2 | 4165 | 5605 |
| 67 | Triacetin | 2.0 | 302 | 3.1 | +5/8 | 3795 | 5370 |
| 68 | Monoacetin | 1.0 | 309 | 2.4 | −1/2 | 4085 | 5530 |
| 69 | Monoacetin | 2.0 | 306 | 2.7 | +1/8 | 3990 | 5245 |
| 70 | Diacetin | 1.0 | 310 | 2.6 | 0 | 3995 | 5475 |
| 71 | Diacetin | 2.0 | 306 | 3.1 | +1/8 | 4020 | 5390 |
| 72 | Mixed Isopropanolamines plus Diacetin | 0.075 Total (0.025 + 0.05) | 307 | 3.0 | −1/4 | 3490 | 4985 |

[1]Acceleration of set is indicated by a minus (−) sign, while retardation of set is indicated by a plus (+) sign.

Table III

| Mix No. | Additive | Dose; Percent by weight of cement | Water; lbs./ cu. yd. of cement product | Air; vol. percent of cement product | Rate of hardening relative to plain mix;[1] hours | Compressive strength of cement product; p.s.i. | |
|---|---|---|---|---|---|---|---|
| | | | | | | 1 day | 28 days |
| Cement No. 1 | | | | | | | |
| 73 | None | | 324 | 1.4 | 0 | 830 | 4515 |
| 74 | Diacetin | 1.0 | 315 | 2.3 | −⅛ | 765 | 5070 |
| 75 | Triacetin | 1.0 | 313 | 2.4 | −⅛ | 735 | 5255 |

Table III-continued

| Mix No. | Additive | Dose; Percent by weight of cement | Water; lbs./ cu. yd. of cement product | Air; vol. percent of cement product | Rate of hardening relative to plain mix;[1] hours | Compressive strength of cement product; p.s.i. | |
|---|---|---|---|---|---|---|---|
| | | | | | | 1 day | 28 days |
| 76 | Monoacetin | 1.0 | 316 | 2.1 | −½ | 760 | 5110 |
| Cement No. 2 | | | | | | | |
| 77 | None | | 318 | 2.1 | 0 | 935 | 4565 |
| 78 | Diacetin | 1.0 | 301 | 3.4 | −1 | 870 | 4935 |
| 79 | Triacetin | 1.0 | 300 | 3.5 | −¾ | 895 | 5270 |
| 80 | Monoacetin | 1.0 | 301 | 3.3 | −1 | 930 | 5210 |
| Cement No. 1 | | | | | | | |
| 81 | None | | 313 | 1.8 | 0 | 825 | 4470 |
| 82 | Diacetin plus Triacetin | 1.0 (0.5+0.5) | 303 | 2.3 | −¾ | 705 | 5020 |
| Cement No. 2 | | | | | | | |
| 83 | None | | 320 | 2.3 | 0 | 905 | 4565 |
| 84 | Diacetin plus Triacetin | 1.0 (0.5+0.5) | 308 | 3.3 | −1⅛ | 885 | 5095 |

[1]Acceleration of set is indicated by a minus (−) sign, while retardation of set is indicated by a plus (+) sign.

While the one day strengths were generally less than those for plain mixes, the compressive strengths at 28 days, as well as the fact that the acetin mixture produced acceleration of the rate of hardening of the cement mix substantiate the usefullness of mixtures of acetins in the same manner in which the acetins, singly, are useful.

For the purpose of illustrating the utility of the acetins in other hydraulic cements, diacetin was tested in limited dosages in a commercially available high alumina cement mix. Diacetin was selected simply as an example of an acetin, and was employed in dosages of 0.05% and 0.10% by weight based upon the weight of the cement. The high alumina cement employed was "CEMENT FONDU", which typically comprises, in percentages by weight, 40% $Al_2O_3$, less than 2% $TiO_2$, 38% CaO, 11% $Fe_2O_3$, 4% FeO, and less than 5% $SiO_2$, but other high alumina cements are available, such as "LUMNITE" and "REFCON", and could have been employed. The cement mix comprised a high alumina concrete mix containing about 5½ sacks (at 94 lbs. per sack) of cement per cubic yard of concrete, the fine aggregate to coarse aggregate ratio was 0.47, and the consistencies of the concretes were such that they had slumps in the range of 3¼ to 4 inches. The results, which are set forth in Table IV, and which, for convenience, show the compressive strengths at one and seven days only, show that the acetins are useful in high alumina cements to increase the compressive strength of the hardened cement mix. The fact that the acetins produced a retardation in the rate of hardening of the cement mix involved means that the acetins also would be useful as retarders per se in high alumina cements, whereas in portland type cements the acetins would be useful as accelerators per se.

It is within the scope of the invention to incorporate, in the cement mixes prepared as herein provided, other additives known in the art for the express purpose for which they are normally employed.

Such other additives may, for example, be air-entraining agents, air-detraining agents, pozzolanic materials, fly-ash, coloring agents, water repellants, set accelerators, and the like. The acetins may also be employed in conjunction with a combination of such cement additives to produce desired changes in the physical properties of the concrete being produced, as is confirmed by the runs in Tables I and II wherein combinations of acetins were made with a triethanolamine admixture and a mixed isopropanolamine admixture.

It is also within the scope of the invention to employ the acetins together with known set retarders, such as lignosulfonates, sugars, glucosacchardes, and the like, or combinations thereof to obtain improvement in the compressive strength of the hardened mix, but with less retarding effect than would result from such set retarders. The acetins and said known set retarders can also be employed together with conventional set accelerators as mentioned above to achieve a desired combination of benefits.

While the invention has been described with reference to certain preferred embodiments thereof, those skilled in the art will appreciate that various changes and modifications and substitutions can be made without departing from the spirit of the invention. It is intended, therefore, that the invention will be limited only by the scope of the claims which follow.

What I claim is:

1. A process for increasing the compressive strength and accelerating the rate of hardening of portland type cement mixes comprising adding to said cement in additive comprising at least one acetic acid ester of glycerin in an amount of between about 0.025% and about 2.0% by weight based upon the weight of the cement when said ester is monoacetin or diacetin and in an amount of between about 0.01% and about 2.0% by weight based upon the weight of the cement when said ester is triacetin to thereby accelerate the rate of hardening of said Table IV

| Dose of Diacetin Additive; percent by weight of cement | Cement; lbs./ cu. yd. of cement product | Water; lbs./ cu. yd. of cement product | Air; vol. percent of cement product | Rate of hardening relative to plain mix;[1] hours | Compressive strength of cement product; p.s.i. | |
|---|---|---|---|---|---|---|
| | | | | | 1 day | 7 days |
| None | 514 | 296 | 1.5 | 0 | 3500 | 4060 |
| 0.05 | 507 | 288 | 2.9 | +¾ | 3800 | 4380 |
| 0.10 | 507 | 286 | 3.0 | +2¼ | 3820 | 4750 |

[1]Acceleration of set is indicated by a minus (−) sign, while retardation of set is indicated by a plus (+) sign.

mix and increase the compressive strength of the mix when hardened.

2. A process as claimed in claim 1 wherein said cement mix comprises said cement, aggregate and sufficient water to effect hydraulic setting of said cement.

3. A process as claimed in claim 2 wherein said aggregate comprises sand and said cement mix comprises a mortar mix.

4. A process as claimed in claim 2 wherein said aggregate comprises sand and crushed stone or gravel and said cement mix comprises a concrete mix.

5. A process as claimed in claim 1 wherein, when said additive is monoacetin or diacetin, said additive is present in an amount of between about 0.025% and about 1.0% by weight based upon the weight of the cement, and when said additive is triacetin, said additive is present in an amount of between about 0.01% and about 1.0% by weight based upon the weight of the cement.

6. A process as claimed in claim 1 wherein, when said additive is monoacetin, said additive is present in an amount of between 0.05% and about 1.0% by weight based upon the weight of the cement, when said additive is diacetin, said additive is present in an amount of between about 0.1% and 1.0% by weight based upon the weight of the cement, and when said additive is triacetin, said additive is present in an amount of between about 0.01% and about 1.0% by weight based upon the weight of the cement.

7. A process for increasing the compressive strength of high alumina cement mixes comprising adding to said cement an additive comprising at least one acetic acid ester of glycerin in an amount of up to about 2.0% by weight based upon the weight of the cement to thereby increase the compressive strength of the mix when hardened.

8. An improved high alumina cement mix made in accordance with the process of claim 7.

* * * * *